US007924712B2

(12) United States Patent
Alex et al.

(10) Patent No.: US 7,924,712 B2
(45) Date of Patent: Apr. 12, 2011

(54) PROCESSING PLATFORM SELECTION METHOD FOR DATA PACKET FILTER INSTALLATION

(75) Inventors: Arun C. Alex, Bartlett, IL (US); Kunnath Sudhir, Bolingbrook, IL (US); Abhishek Sharma, Streamwood, IL (US)

(73) Assignee: UTStarcom, Inc., Alameda, CA (US)

( * ) Notice: Subject to any disclaimer, the term of this patent is extended or adjusted under 35 U.S.C. 154(b) by 1267 days.

(21) Appl. No.: 11/018,081

(22) Filed: Dec. 21, 2004

(65) Prior Publication Data

US 2006/0133267 A1 Jun. 22, 2006

(51) Int. Cl.
*H04L 12/26* (2006.01)
(52) U.S. Cl. ......... 370/230; 370/235; 370/401; 709/224
(58) Field of Classification Search .................. 370/229, 370/230, 231, 400, 401, 428, 235; 709/223–225; 726/13
See application file for complete search history.

(56) References Cited

U.S. PATENT DOCUMENTS

| | | | | |
|---|---|---|---|---|
| 5,606,668 | A | * | 2/1997 | Shwed .............................. 726/13 |
| 5,790,554 | A | * | 8/1998 | Pitcher et al. ................. 370/471 |
| 6,434,618 | B1 | | 8/2002 | Cohen et al. |
| 6,570,875 | B1 | | 5/2003 | Hegde |
| 6,594,268 | B1 | * | 7/2003 | Aukia et al. .................. 370/400 |
| 6,717,943 | B1 | | 4/2004 | Schwering |
| 6,738,377 | B1 | | 5/2004 | Boden |
| 6,772,347 | B1 | * | 8/2004 | Xie et al. ......................... 726/11 |
| 6,807,576 | B1 | * | 10/2004 | Jeffries et al. ................. 709/225 |
| 7,284,269 | B2 | * | 10/2007 | Marquet et al. ................. 726/13 |
| 7,415,723 | B2 | * | 8/2008 | Pandya ........................... 726/13 |
| 2004/0250131 | A1 | * | 12/2004 | Swander et al. .............. 713/201 |
| 2006/0123481 | A1 | * | 6/2006 | Bhatnagar et al. ............. 726/24 |

OTHER PUBLICATIONS

International Search Report mailed Oct. 26, 2006 for PCT/US2005/44288.
Written Opinion mailed Oct. 26, 2006 for PCT/US2005/44288.
International Preliminary Report on Patentability mailed Jun. 26, 2007 for PCT/US2005/44288.

* cited by examiner

*Primary Examiner* — Pankaj Kumar
*Assistant Examiner* — Duc T Duong
(74) *Attorney, Agent, or Firm* — Schwabe, Williamson & Wyatt P.C.

(57) ABSTRACT

In a data packet system (100) comprised of a plurality of processing platforms that are each at least potentially in-line with respect to a flow of data packets, upon receiving (401) an installation of a data packet filter, automatically selecting (402) where, from amongst that plurality of process platforms, to effect the data packet filter. This can comprise, if desired, parsing of the filter to ascertain its characterizing requirements and accessing information regarding the processing platforms to determine which platforms are capable of effecting those requirements. Numerous other factors can also be taken into account to aid in assuring an appropriate selection.

29 Claims, 4 Drawing Sheets

PROCESSING PLATFORM SELECTION METHOD FOR DATA PACKET FILTER INSTALLATION

TECHNICAL FIELD

This invention relates generally to data packet systems and more particularly to data packet filters.

BACKGROUND

Data packet systems of various kinds are known in the art. Such systems generally serve to source and/or receive, process, and/or route data packets. Many such systems make use of a plurality of data packet filters to facilitate such functionality in an appropriate and controlled manner.

For example, to support a Packet Data Serving Node (PDSN) application, data packet filters are typically deployed to support such purposes as:

Intrusion detection and/or prevention;
Network isolation for disabling external nodes from accessing parts of an access network;
Restricting the kinds of applications that a given mobile user can access;
Restricting improper forwarding of mobile-to-mobile node traffic hosted by a shared Packet Data Serving Node;
Billing and other accounting activities;

to name a few.

Such filters are often specified using various fields that are present in packet headers. For example, data packet filters can be defined using headers of Open Systems Interconnection (OSI) Layers 1 through 7 though more typically such filters are based on the network layer of Internet Protocol headers. It is also possible, of course, to define a data packet filter, in whole or in part, based on the payload being carried by the packet. For example, data packet filters designed to detect and/or counter virus attacks may be so characterized.

Modern data packet systems often include multiple network entities that share a common chassis. Such farm-styled architectures, for example, accommodate a variety of physical cards to each effect one or more applications or purposes. As a result, various such processing platforms are often at least potentially in-line with respect to a flow of data packets through such a data packet system.

At present, data packet filters are typically installed at one central location within such a data packet system. This approach, unfortunately, can compromise the performance of the data packet system and, even worse, may even fail with respect to providing a desired level of effective control. A centralized location can yield suboptimal results for various reasons.

For example, in some cases, the centralized location may require a software implementation of a given data packet filter. A software implementation, however, may be unduly slow or otherwise unacceptably computationally intensive. As another example, the sheer bulk (and/or processing load) of data packet filters in a given data packet system may cause a centralized installation scheme to constitute a bottleneck with respect to data packet flow.

It should also be noted that a given element such as a Packet Data Serving Node typically comprises an ultimately capacity-limited platform. For example, some Packet Data Serving Nodes are presently capable of supporting about 40,000 simultaneous packet data sessions. As the centralized number of packet data filters installed in that Packet Data Serving Node increases, however, this capacity tends to diminish.

BRIEF DESCRIPTION OF THE DRAWINGS

The above needs are at least partially met through provision of the processing platform selection method for data packet filter installation described in the following detailed description, particularly when studied in conjunction with the drawings, wherein.

Figure 1:
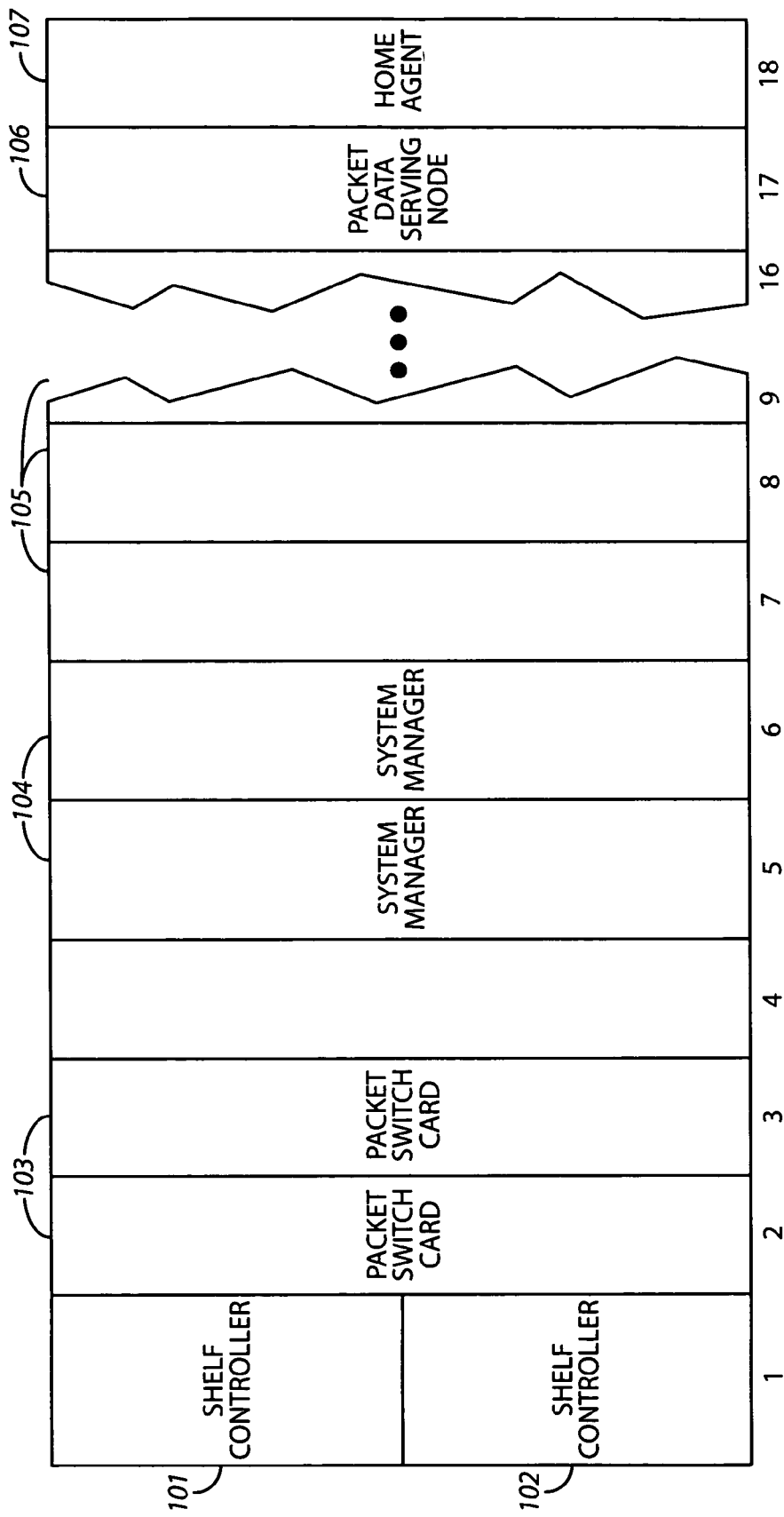
FIG. 1 comprises a schematic front elevational view of prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these teachings are applicable for use with a plurality of processing platforms that are each at least potentially in-line with respect to a flow of data packets. Pursuant to these various embodiments, upon receiving an installation of a data packet filter, one then automatically selects where, from amongst the plurality of processing platforms, to effect the data packet filter.

In a preferred approach the data packet filter comprises one or more characterizing rules. A preferred process can thereby select from amongst processing platforms that are each capable of effecting such rule (or rules). It is also possible, when a given data packet filter comprises a plurality of rules, to parse the effectuation of such rules over a plurality of processing platforms.

Pursuant to some approaches, this process can include determining whether to effect a data packet filter, in part or in whole, via a hardware implementation, a software implementation, or some combination thereof. It is also possible to employ these teachings in a dynamic fashion such that, over time, a given data packet filter is effected by various elements of a data packet system (to thereby accommodate, for example, loading changes over time with respect to the respective loading of such various elements). Pursuant to a preferred approach, it is also possible to effect the installation of the parsed elements of a given data packet filter in a hierarchical manner with respect to the elements of a given data packet system and the flow (or likely flow) of data packets through the system.

So configured and deployed, these teachings take advantage of the various physical points in a given data packet system (such as, but not limited to, a shared chassis) as lie in a data packet flow path to effect an improved or even optimized filter installation to thereby provide more effective usage of the system and/or reduced negative impact on the performance of such a system. These teachings can also be employed to permit a relatively increased filtering capability than might otherwise be expected with a given system.

These and other benefits may become clearer upon making a thorough review and study of the following detailed description. Referring now to the drawings, and in particular to FIG. 1, it may be helpful to first describe in more detail an illustrative packet data system 100. This particular system 100 comprises a rack-mountable chassis having 18 slots to accept any of a variety of cards (also known as blades). In a fairly typical configuration, this system 100 includes two shelf controllers 101 and 102 that both occupy a first slot and two packet switch cards 103 that occupy slots 2 and 3, respectively. Such duality provides redundancy for each platform. In similar fashion two system manager cards 104 typically occupy slots 5 and 6. The remaining slots generally receive a mix of application cards. These application cards (and, for purposes of this description, the constituent components and subsystems of such applications cards) comprise processing platforms that typically support such applications as a Packet Data Serving Node 106, a Home Agent 107, and so forth.

These cards typically couple to a backplane and interact with one another in various ways via that backplane to support the creation and/or manipulation of various data packets. In particular, such a system serves primarily to effect the receipt of data packets from external sources and the routing of such data packets to respective external targets. Such chassises are well understood in the art and require no further elaboration here save to note that such a configuration offers a rich plurality of various data packet flows within and between such chassis elements.

Figure 2:
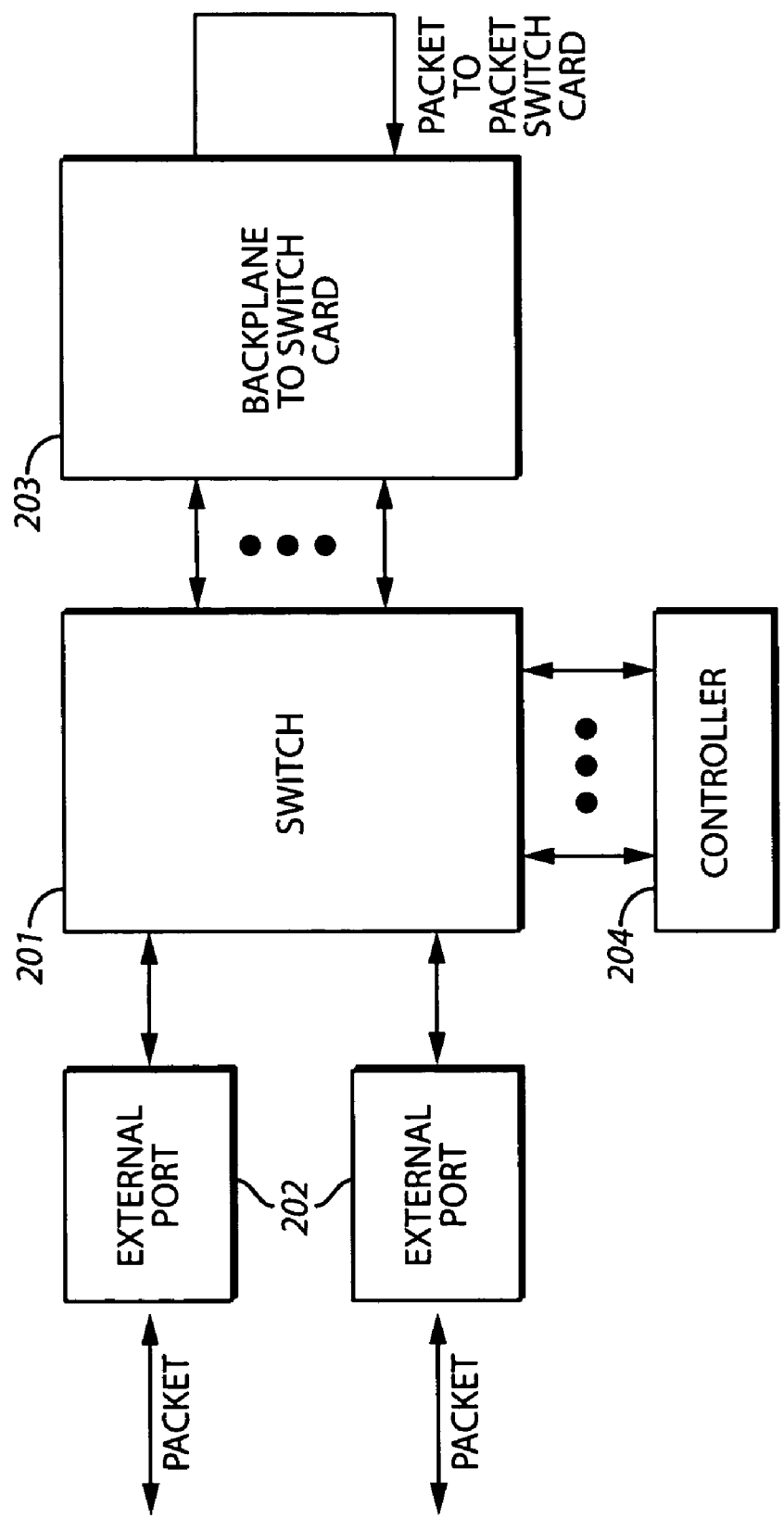
FIG. 2 comprises a block diagram view of prior art.

FIG. 2 depicts an application processing platform 200 as typifies present practice in this regard. This processing platform 200 provides a switch 201 (such as a 10 port gigabit Layer 2 switch) that intercouples two external ports 202 (which facilitate, for example, the exchange of data packets with external sources/targets), two backplane-to-switch cards 203 (which facilitate, for example, the exchange of data packets with a packet switch card), and a controller 204 that typically comprises a software platform (to facilitate, for example, the functionality of a Packet Data Serving Node or the like).

Such a configuration is well known in the art. Those skilled in the art will appreciate that various potential data packet flows are accommodated by such a configuration. A typical path might comprise:

Receiving an incoming data packet via one of the external ports 202;

Routing of that data packet through the switch 201 to a backplane-to-switch card 203 (to permit receipt and processing/routing as appropriate by other elements within the system including, though not limited to, other elements as share the same chassis with this particular processing platform 200);

Receiving the processed or re-routed data packet via one of the backplane-to-switch cards 203;

Receiving and processing the data packet at the controller 204;

Sending the processed data packet via the backplane-to-switch card 203

Outputting the data packet via one of the external ports 202 (to, for example, a specific target recipient).

As will be shown below, data packet filtering can be effected as per this invention at various such points within such a system.

Figure 3:
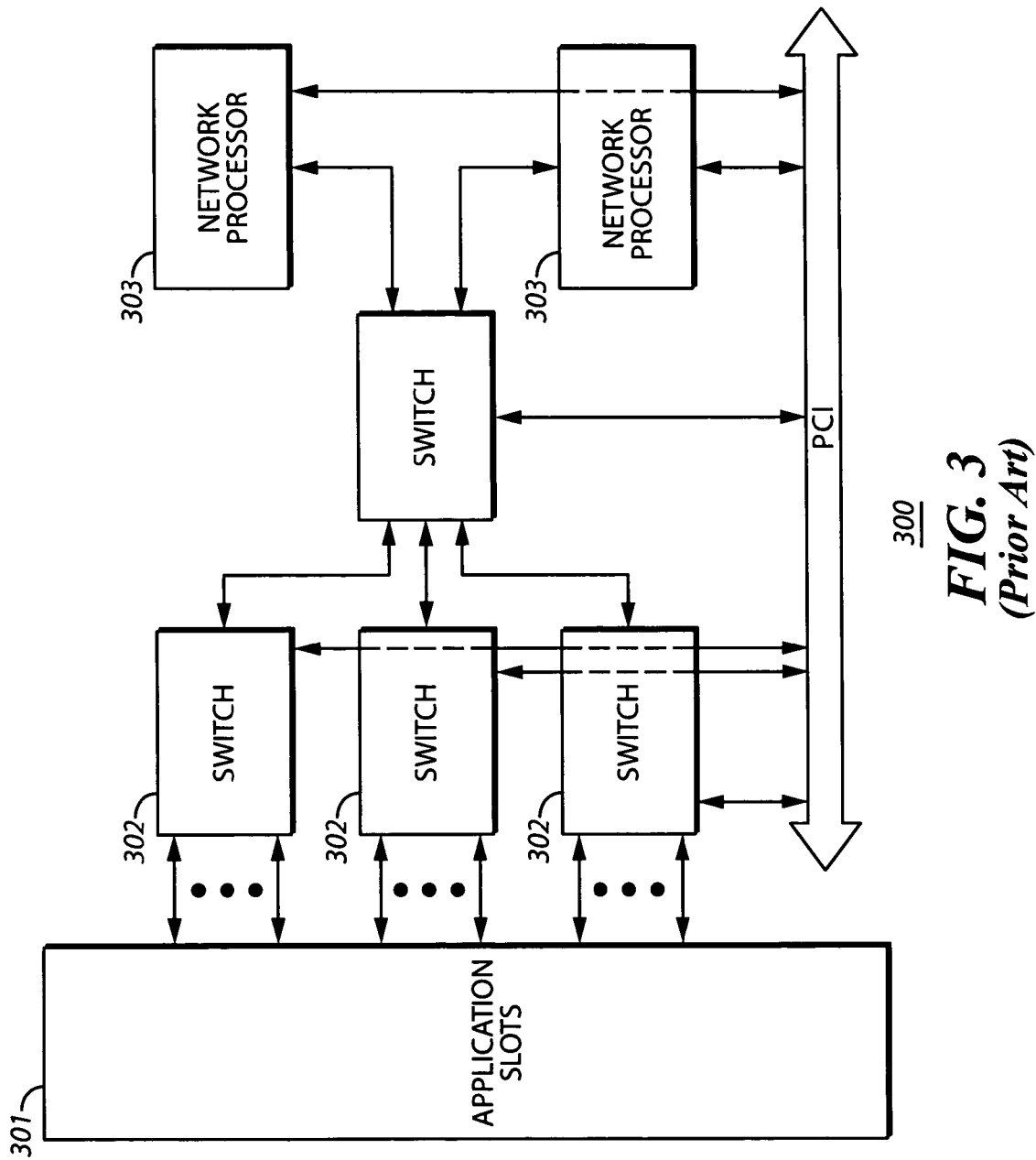
FIG. 3 comprises a block diagram view of prior art.

FIG. 3 provides an illustrative depiction of a prior art packet switch card 300 configuration. Those skilled in the art will recognize that a packet switch card provides gigabit connectivity between the various application cards as occupy a given chassis. This illustration notes the data packet paths that couple the packet switch card 300 to each of the slots 301 of the above-described chassis. This coupling includes an interface that comprises, in this illustrative example, an L2 Ethernet Switch 302. This packet switch card 300 also comprises, in accordance with present practice, two network processors 303. Those skilled in the art will now understand that such switches 302 and network processors 303 are further examples of processing platforms that are each at least potentially in-line with respect to a flow of data packets. Further, such Ethernet switches 302, for example, are quite capable of supporting up to Layer 3 data packet filtering (and could be employed, for example, to prevent external hosts from sending ICMP messages to the RP or Pi ports) while the network processors 303 are capable of effecting line speed Layer 1 through 7 classifications (and could be employed, for example, to detect viruses or hacking signatures and generate a corresponding alarm). Furthermore, each such Ethernet switch 302 is able to support up to 128 different filter rules per port while network processors 303 have sufficient capacity to literally handle millions of filters. Accordingly, such elements are ready candidates to support partially or fully effecting the functionality of a given data packet filter in accord with the teachings set forth herein.

The above examples of a data packet system serve only an illustrative purpose with many other examples presently existing and others no doubt to be developed in the future. One purpose in providing this information is to demonstrate the great number of opportunities that exist to effect a data packet filter (in whole or in part) at any of a great number of locations within such data packet systems. Processes for assessing such opportunities, and for effecting a dispersed installation strategy in such a setting, will now be described.

Figure 4:
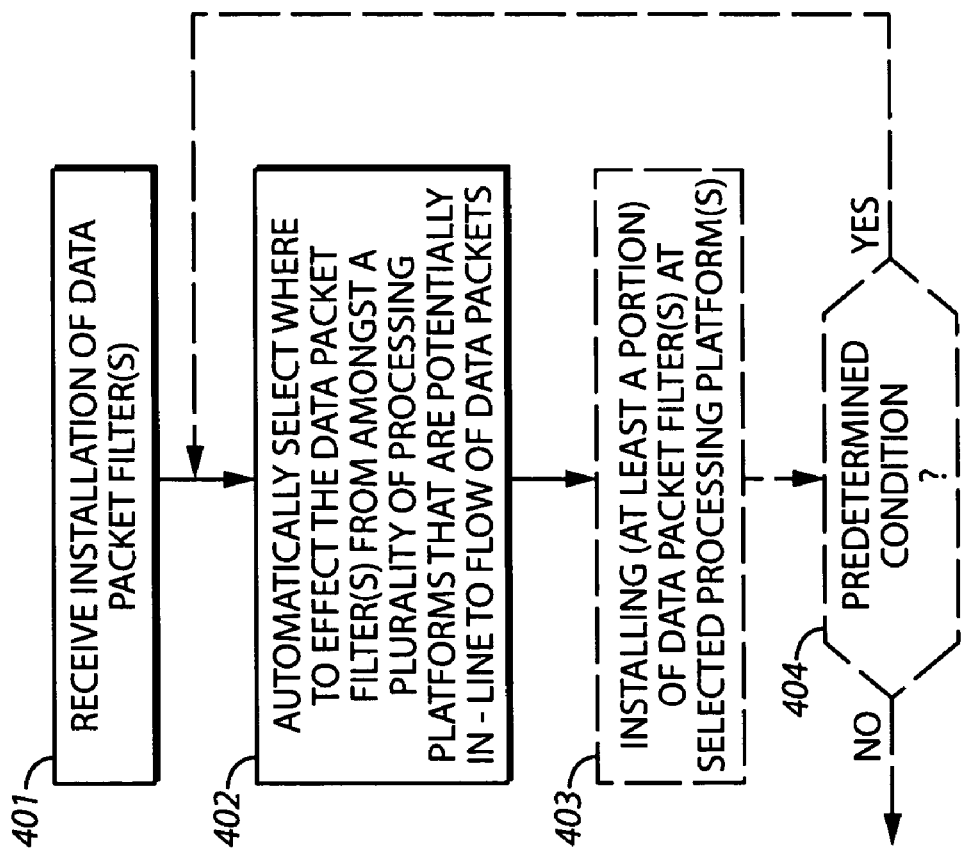
FIG. 4 comprises a flow diagram as configured in accordance with various embodiments of the invention.

Referring to FIG. 4, an exemplary process 400 operates in a setting having a plurality of processing platforms that are each at least potentially in-line with respect to a flow of data packets such as, but not limited to, the packet data systems described above. This process 400 typically begins upon receiving 401 an installation of a data packet filter (or filters). Such a data packet filter will typically comprise at least one (and often more than one) rule as is understood in the art. An illustrative example of a rule would be a characterizing requirement that the data packet filter operate on a packet bearing a Layer 2 address as versus a Layer 3 address. Other illustrative examples would be a characterizing requirement to Drop a data packet having a particular destination Internet protocol address with User Datagram Protocol (UDP) and a specific destination port number or to Forward a data packet having a specific source Internet Protocol to a specific AGW card. In many cases, such rules will also be accompanied by a particular corresponding action to be effected by the data packet filter when the conditions of the rule are met (or not met as the case may be).

Generally speaking, this process 400 then automatically selects 402 where, from amongst the plurality of processing platforms, to effect the data packet filter. More particularly, this step comprises, in a preferred approach, selecting where to effect the rule (or rules) that characterize the data packet filter. At one level, this can comprise selecting, for example, whether to effect a given rule at a packet switch card, a Packet Data Serving Node card, or a Home Agent card as may all share a common chassis. At another level, this can comprise further selecting which part or parts of a given network entity to employ when effecting the rule. For example, when selecting a packet data card (such as the packet data card 300 described above with respect to FIG. 3) one can further determine whether to use, for example, an Ethernet switch 302 or a network processor 303 to effect the rule in question.

This step can comprise, if desired, first parsing the data packet filter into its constituent rules, as it may be possible to implement the data packet filter in a distributed fashion over multiple processing platforms. This is especially true when one takes account of the topology of a given system and the packet flow path and hierarchical progression of platforms as corresponds to that path. For example, when a filter features two rules, and it is important that one of those rules be effected first, it becomes more important to understand that this first rule should be located further upstream in the data flow path than the second rule. By observing such a convention, however, it then becomes possible to effectively distribute the filtering function over a plurality of processing platforms and thereby avoid a centralized filter staging paradigm. So configured, the various rules as characterize a given data packet filter may be effected by separate processing platforms.

When implementing this step 402, it may be helpful to provide a list of rule-compliant capabilities for each of the available plurality of processing platforms. Such a list can then be accessed and used to facilitate the selection of a particular one of the plurality of processing platforms to effect the rule (or rules) of a given data packet filter. For example, Table 1 illustrates such a list for four different processing platforms.

TABLE 1

|        | Processing Platform A | Processing Platform B | Processing Platform C | Processing Platform D |
|--------|-----------------------|-----------------------|-----------------------|-----------------------|
| Rule 1 | X                     |                       | X                     |                       |
| Rule 2 | X                     | X                     |                       |                       |
| Rule 3 |                       | X                     | X                     | X                     |
| Rule 4 | X                     | X                     | X                     | X                     |
| ...    |                       |                       |                       |                       |
| Rule N | X                     |                       |                       |                       |

Such a list can be employed in various ways. For example, consider a packet data filter that requires a combination of Rule 1 and Rule 2. Such a filter can be effected in its entirety by processing platform A. It would also be possible to effect this filter by effecting Rule 1 using processing platform C and Rule 2 using processing platform A or B or by effecting Rule 1 using processing platform A and Rule 2 using processing platform B.

For purposes of this example, it may further be ascertained that processing platforms A and B are not appropriately situated from a hierarchical point of view, as, in this example, the data packet filter requires that Rule 1 be effected prior to Rule 2 and processing platform A is downstream of processing platform B such that Rule 2 would be effected by processing platform B before processing platform A can effect Rule 1. By taking such considerations into account, the selection candidates would therefore reduce to processing platform A alone or in combination with processing platform C.

A selection can be made between two such options using any selection criteria as may be useful and valid in a given setting. Some selection criteria that may be usefully employed in at least some settings are:

Whether loading conditions at one or more of the candidate processing platforms are such as to encourage or discourage further loading as may be associated with effecting the data packet filter rules;

Whether the processing platform is functionally capable of matching the filter rule;

Whether one of these candidate processing platforms is more or less capable of efficiently and quickly handling the data packet filter rule(s) (for example, one of the candidate processing platforms may comprise a hardware element that will serve as the effecting platform and this option may operate considerably faster than a software implementation that might be possible at another available processing platform);

Whether the processing platform is functionally capable of effecting the action on the data packet.

This selection step 402 may also optionally take temporal considerations into account. For example, this process may have access to historical (or scheduling) information that can influence the selection process. As one illustration based upon the above example, it may be known that processing platform A, though presently lightly loaded, regularly experiences loading peaks that may impact upon its ability to effect the rules of this data packet filter. In such a case, if the data packet filter is only to be implemented for a brief and immediate period of time, it may be acceptable to place implementation responsibility for both Rule 1 and Rule 2 at processing platform A.

On the other hand, if this data packet filter is to remain in effect for a long (or unknown) duration of time, it may be better to parse filter implementation between processing platform A and C in order to more lightly load processing platform A and thereby hopefully avoid filter implementation problems during peak loads for processing platform A.

As yet another illustration, it may be decided to use both filter-implementation candidates by selecting only candidate platform A to effect the filter rules in the present timeframe while scheduling both candidate platforms A and C to implement the characterizing rules in a distributed manner at a later scheduled time. This approach may allow superior processing capability at processing platform A to be used when that processing power is likely available and to accept less capable processing at a later time when platform A is likely less able to provide superior service in any event.

Upon providing a selected processing platform (or platforms), this process 400 then optionally provides for installation 403 of at least a portion of the data packet filter at the selected processing platform(s) (for example, by effecting observance of the rule or rules that define the filter at the selected processing platform(s)). As noted above, these platforms can differ from one another with respect to their essential makeup. As a result, installing the filter can comprise installing a substantially software version of the filter, installing a substantially hardware version of the filter, or some combination thereof.

In some cases the defining filter may be installable in an existing form (for example, when the presentation of the rule and the implementing syntax of the selected processing platform are compatible with one another). In other cases, however, it may be necessary to modify at least one of the filter rules to permit compatible execution of the filter rule by the selected processing platform. As another related example, in some cases it may be necessary to modify a given filter rule to express that filter rule as a substantially hardware implementation. The software and hardware for the platforms as comprise, in the aggregate, a given data packet system are usually sufficient known and understood (or can be sufficiently known and understood) to permit such modifications by those skilled in the art. It would also be helpful, and likely preferable, to predefine such modifications in order to permit automatic modification of a given packet data rule when the need presents itself.

As described above, for the most part this process 400 serves to effect an initial selection and placement of a given data packet filter. If desired, however, this process 400 can be employed in a more dynamic fashion. In particular, this process 400 can be used to reconsider and/or reselect the particular enabling processing platform(s) of choice as pertain to a given data packet filter. For example, and with continued reference to FIG. 4, at some subsequent time following installation of a given data packet filter, and upon detecting 404 a given predetermined condition, this process 400 can essentially return to again consider the selection 402 of where to best effect that data packet filter.

The predetermined condition can be any condition or state of interest or concern in a given setting or circumstance. Some potentially useful conditions include, but are not limited to:

A temporal circumstance (such as a time of day or day of the week);

An attained loading level for a given processing platform;

A fault detection (or correction);

Impaired (or improved) packet throughput (with respect to a particular processing platform, the packet data network as a whole, or the like).

The above described processes essentially comprise, in part, a filter pre-processing application that can parse a defined filter and evaluates that filter with respect to various points of interest and/or concern. These points can optionally comprise, but are not limited to:

Application type (i.e., Packet Data Serving Node type, Home Agent, type, and so forth);

Connectivity within the chassis and available filter attachment points;

The filter definition itself (to aid in identifying, for example, a relevant and useful point of attachment);

Whether a filter should be installed at the ingress or the egress data packet path (for example, if a session specific data packet filter is installed at the ingress point on a network processor, then that network processor will not be able to see the Internet Protocol address of the mobile node due to R-P/PPP encapsulation and should therefore more preferably be installed at the egress point when the packet is about to be forwarded to a next hop gateway);

whether the filter is best applied on, for example, a given L2 switch or a network processor rather than on an application card (in which case, of course, post-processing of the filter rule may be appropriate to convert the filter rule to an appropriate format).

These processes can be carried out via any suitable enabling platform within (or without) such a packet data system. In many cases the processing platforms of such a system themselves comprise programmable platforms that can, with corresponding programming, comport with these teachings as will be well understood by those skilled in the art. It will also be understood that these processes can be effected via a centralized processor or can be enabled as a distributed process. Again, such architectural choices and options are well understood in the art.

So configured and deployed, these teachings facilitate, upon receiving an installation of a data packet filter (which data packet filter is characterized by at least one filter rule), the automated selection of where, from amongst a plurality of processing platforms, to effect the filter to thereby contribute to efficient operation of the data packet system. This selection is preferably based upon a parsed analysis of the underlying rules that characterize the filter as well as information regarding the rule-supporting capabilities of the candidate processing platforms. Depending upon the embodiment, this selection can be accompanied by modification of the data packet filter rules to aid in ensuring compatible and successful implementation of the data packet filter rules by the selected platforms.

It will be understood and appreciated that these teachings are applicable with a wide variety of data packet filters, including filters designed for various and sundry purposes. Similarly, these embodiments are readily applicable to any of a wide variety of packet data processing platforms, components, and systems. Those skilled in the art will also appreciate that these teachings tend to scale in a favorable manner. In particular, as a given system grows in size and becomes more complex and intertwined, these teachings offer genuine assistance with respect to aiding and ensuring proper and efficient placement and operation of packet data filters within that system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with a plurality of processing platforms that are each at least potentially in-line with respect to a flow of data packets, the method comprising:

receiving an installation of a data packet filter that includes a first rule and a second rule, wherein the first rule is to be effected before the second rule; and automatically selecting where, from amongst the plurality of processing platforms, to effect the data packet filter by:

automatically selecting where, from amongst two or more of the plurality of processing platforms that are capable to effect the first rule, to effect the first rule; and automatically selecting where, from amongst two or more of the plurality of processing platforms that are capable to effect the second rule, to effect the second rule;

such that the first and second rules may be effected by separate respective first and second processing platforms, the first processing platform being upstream of the second processing platform in the flow of data packets.

2. A method for use with a plurality of processing platforms that are each at least potentially in-line with respect to a flow of data packets, the method comprising:

receiving an installation of a data packet filter that includes a first rule and a second rule, wherein the first rule is to be effected before the second rule; and automatically selecting where, from amongst the plurality of processing platforms, to effect the data packet filter, by:

accessing at least one list of rule-compliant capabilities for each of the plurality of processing platforms; and using the at least one list to select:

a first, from amongst two or more of the plurality of processing platforms that are capable to effect the first rule, to effect the first rule, and a second, from amongst two or more of the plurality of processing platforms that are capable to effect the second rule, to effect the second rule, wherein the first processing platform is upstream of the second processing platform in the flow of data packets.

3. The method of claim 2 wherein said automatically selecting further comprises:
further selecting the first or second of the plurality of processing platforms as a function, at least in part, of system processing efficiency.

4. The method of claim 2, further comprising modifying either the first rule or the second rule to enable compatible execution by the respective first or second processing platforms.

5. The method of claim 1 wherein said automatically selecting where to effect the data packet filter further includes selecting the first and second processing platforms according to their respective loading conditions.

6. The method of claim 5 wherein if at least one of the first and second processing platforms is presently lightly loaded but experiences loading peaks that impact upon its capability to effect the data packet filter, then said at least one of the first and second processing platforms is selected if the data packet filter is to be implemented for only an immediate brief period of time.

7. The method of claim 5 wherein if at least one of the first and second processing platforms is presently lightly loaded but experiences loading peaks that impact upon its capability to effect the data packet filter, then a third processing platform other than said at least one of the first and second processing platforms is selected if the data packet filter is to be implemented for a long or unknown period of time.

8. The method of claim 1 wherein said automatically selecting where, from amongst the plurality of processing platforms, to effect the data packet filter further includes selecting based on whether a hardware element of an effecting platform operates faster than a software implementation at another processing platform.

9. The method of claim 1, further comprising modifying either the first or the second rule to enable compatible execution by the respective first or second processing platforms.

10. The method of claim 1, further comprising effecting the first rule, by the respective first processing platform, at a later timeframe subsequent to a present timeframe, wherein the first processing platform has more processing power available at said later timeframe as compared to said present timeframe.

11. The method of claim 1 wherein said data packet filter further includes other rules in addition to said first and second rules.

12. A method for use with a data packet system having a plurality of processing platforms that are each at least potentially in-line with respect to a flow of data packets, the method comprising:
receiving an installation of a data packet filter that includes a first rule and a second rule, wherein the first rule is to be effected before the second rule; and
automatically selecting where, from amongst two or more of the plurality of processing platforms that are capable to effect the first rule and from amongst two or more of the plurality of processing platforms that are capable to effect the second rule, to respectively effect each of the first and second rules;
installing each of the first and second rules at corresponding selected first and second processing platforms,
wherein the first processing platform is upstream of the second processing platform in the flow of data packets, and
wherein said automatically selecting includes:
accessing at least one list of rule-compliant capabilities for each of the plurality of processing platforms; and
using the at least one list to select the first and second of the plurality of processing platforms to effect corresponding said first and second rules.

13. The method of claim 12, further comprising modifying either the first rule or the second rule to enable compatible execution by the respective first or second processing platforms.

14. The method of claim 12 wherein said automatically selecting further includes selecting the first and second processing platforms according to their respective loading conditions.

15. An apparatus, comprising:
a plurality of processing platforms that are each in-line with respect to a flow of data packets; and
a processor configured to:
process a data packet filter that includes a first rule and a second rule, wherein the first rule is to be effected before the second rule; and
select, from amongst the plurality of processing platforms:
a first processing platform, from amongst two or more of the plurality of processing platforms that are capable to effect the first rule, to effect the first rule, and
a second processing platform, from amongst two or more of the plurality of processing platforms that are capable to effect the second rule and that are downstream of the first processing platform, to effect the second rule.

16. The apparatus of claim 15 wherein the processor is further configured to select the first and second processing platforms according to their respective loading conditions.

17. The apparatus of claim 16 wherein if at least one of the first and second processing platforms is presently lightly loaded but experiences loading peaks that impact upon its capability to effect the data packet filter, then the processor is configured to select said at least one of the first and second processing platforms if the data packet filter is to be implemented for only an immediate brief period of time.

18. The apparatus of claim 16 wherein if at least one of the first and second processing platforms is presently lightly loaded but experiences loading peaks that impact upon its capability to effect the data packet, then the processor is configured to select a third processing platform other than said at least one of the first and second processing platforms if the data packet filter is to be implemented for a long or unknown period of time.

19. The apparatus of claim 15 wherein the processor is configured to select based on whether a hardware element of an effecting platform operates faster than a software implementation at another processing platform.

20. The apparatus of claim 15 wherein the processor is further configured to modify either the first rule or the second rule to enable compatible execution by the respective first or second processing platforms.

21. The apparatus of claim 15 wherein the first processing platform is configured to effect the first rule at a later timeframe subsequent to a present timeframe, wherein the first processing platform has more processing power available at said later timeframe as compared to said present timeframe.

22. The apparatus of claim 15, further comprising at least one chassis that is occupied by the plurality of processing platforms.

23. The apparatus of claim 15 wherein the plurality of processing platforms occupies at least one card.

24. An apparatus, comprising:
a plurality of in-line processing platform means for receiving a flow of data packets; and
processor means for:
  processing a data packet filter that includes a first rule and a second rule, wherein the first rule is to be effected before the second rule; and
  selecting, from amongst the plurality of processing platform means:
    a first processing platform means, from amongst two or more of the plurality of processing platform means that are capable to effect the first rule, for effecting the first rule, and
    a second processing platform means, from amongst two or more of the plurality of processing platform means that are capable to effect the second rule and that are downstream of the first processing platform means, for effecting the second rule.

25. The apparatus of claim 24 wherein the processor means further selects the first and second processing platform means according to their respective loading conditions.

26. The apparatus of claim 24 wherein the processor means selects based on whether a hardware element of an effecting platform means operates faster than a software implementation at another processing platform means.

27. The apparatus of claim 24 wherein the processor means modifies either the first rule or second rule to enable compatible execution by the respective first or second processing platform means.

28. The apparatus of claim 24, further comprising at least one chassis means for accepting the plurality of processing platform means.

29. The apparatus of claim 24 wherein the plurality of processing platform means occupies at least one card.

* * * * *